(12) United States Patent
Adada et al.

(10) Patent No.: US 11,409,749 B2
(45) Date of Patent: Aug. 9, 2022

(54) MACHINE READING COMPREHENSION SYSTEM FOR ANSWERING QUERIES RELATED TO A DOCUMENT

(71) Applicant: Microsoft Technology Licensing, LLC, Redmond, WA (US)

(72) Inventors: Mahmoud Adada, Montreal (CA); Andrew James McNamara, Cambridge (CA); Kaheer Suleman, Cambridge (CA); Xihui Lin, Montreal (CA); En Hui Zhuang, Longueuil (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 484 days.

(21) Appl. No.: 15/808,540

(22) Filed: Nov. 9, 2017

(65) Prior Publication Data
US 2019/0138613 A1  May 9, 2019

(51) Int. Cl.
*G06F 16/33* (2019.01)
*G06F 16/2457* (2019.01)
(Continued)

(52) U.S. Cl.
CPC .... *G06F 16/24578* (2019.01); *G06F 16/3329* (2019.01); *G06F 16/93* (2019.01);
(Continued)

(58) Field of Classification Search
CPC ............... G06F 16/24578; G06F 16/93; G06F 16/3329; G06F 16/951; G06F 17/2705;
(Continued)

(56) References Cited

U.S. PATENT DOCUMENTS

| 5,119,465 | A | * | 6/1992 | Jack | ....................... | G06F 16/258 |
|  |  |  |  |  |  | 717/137 |
| 5,557,722 | A | * | 9/1996 | DeRose | ................ | G06F 40/151 |
|  |  |  |  |  |  | 715/776 |

(Continued)

FOREIGN PATENT DOCUMENTS

| CN | 1265209 A | 8/2000 |
| CN | 101089841 A | 12/2007 |

(Continued)

OTHER PUBLICATIONS

"International Search Report And Written Opinion Issued in PCT Application No. PCT/US2018/058815", dated Jan. 2, 2019, 13 Pages.

(Continued)

*Primary Examiner* — Hanh B Thai

(57) ABSTRACT

A machine reading comprehension system (MRCS) can analyze a larger-sized document that includes multiple pages to predict an answer to a query. For example, the document can have two, five, tens, or hundreds of pages. The MRCS divides the document into multiple sections with each section including a portion of the document. Each section is processed separately by one or more processing circuitries to determine a score for that section. The score indicates how related the section is to the query and/or a probability that the section provides a possible answer to the query. Once all of the sections have been analyzed, the sections are ranked by their scores and a subset of the ranked sections are processed again to determine a predicted answer to the query.

19 Claims, 10 Drawing Sheets

(51) Int. Cl.
  *G06N 20/00* (2019.01)
  *G06F 16/93* (2019.01)
  *G06F 16/332* (2019.01)
  *G06F 16/951* (2019.01)
  *G06F 40/205* (2020.01)
  *G06F 40/258* (2020.01)
(52) U.S. Cl.
  CPC .......... *G06F 16/951* (2019.01); *G06F 40/205* (2020.01); *G06F 40/258* (2020.01); *G06N 20/00* (2019.01)
(58) Field of Classification Search
  CPC .......... G06F 17/2745; G06F 17/30864; G06N 20/00; H04L 29/06; H04L 29/06095
  USPC ......................................................... 707/748
  See application file for complete search history.

(56) References Cited

U.S. PATENT DOCUMENTS

| | | | |
|---|---|---|---|
| 7,725,499 B1* | 5/2010 | von Lepel | G06Q 30/02 707/811 |
| 8,265,925 B2* | 9/2012 | Aarskog | G06F 40/289 707/706 |
| 8,275,803 B2 | 9/2012 | Brown et al. | |
| 8,572,049 B2* | 10/2013 | Cheung | H04L 63/126 707/687 |
| 9,529,845 B2 | 12/2016 | Chu-Carroll et al. | |
| 9,542,496 B2 | 1/2017 | Dettman et al. | |
| 9,753,922 B2* | 9/2017 | Hausler | H04L 67/02 |
| 9,940,367 B1* | 4/2018 | Baker | G06F 16/9535 |
| 10,558,712 B2* | 2/2020 | Zholudev | H04L 67/42 |
| 10,650,059 B2* | 5/2020 | Haeusler | H04L 67/1044 |
| 10,762,283 B2* | 9/2020 | Modani | G06N 5/003 |
| 10,824,682 B2* | 11/2020 | Alvares | G06F 16/93 |
| 2004/0083092 A1* | 4/2004 | Valles | G06F 40/30 704/9 |
| 2004/0215606 A1* | 10/2004 | Cossock | G06F 16/337 |
| 2008/0160490 A1* | 7/2008 | Gomes | G09B 7/02 434/350 |
| 2009/0019362 A1* | 1/2009 | Shprigel | G06F 16/374 715/256 |
| 2010/0235164 A1* | 9/2010 | Todhunter | G06F 40/35 704/9 |
| 2010/0306249 A1* | 12/2010 | Hill | G06Q 50/01 707/769 |
| 2014/0079297 A1 | 3/2014 | Tadayon et al. | |
| 2014/0279763 A1* | 9/2014 | Madnani | G09B 7/02 706/12 |
| 2015/0026106 A1* | 1/2015 | Oh | G06F 16/3329 706/12 |
| 2016/0110360 A1* | 4/2016 | Lee | G06F 16/338 707/723 |
| 2016/0232444 A1 | 8/2016 | Fan et al. | |
| 2016/0299884 A1* | 10/2016 | Chioasca | G06F 40/30 |
| 2016/0344828 A1* | 11/2016 | Hausler | H04L 67/1044 |
| 2016/0357855 A1 | 12/2016 | Fan et al. | |
| 2016/0358094 A1 | 12/2016 | Fan et al. | |
| 2017/0147544 A1* | 5/2017 | Modani | G06F 16/345 |
| 2017/0270212 A1* | 9/2017 | Lavrenko | G16B 50/30 |
| 2017/0344541 A1* | 11/2017 | Haeusler | G06Q 30/02 |
| 2018/0204111 A1* | 7/2018 | Zadeh | G06K 9/3233 |
| 2018/0246888 A1* | 8/2018 | Zholudev | G06F 16/24578 |
| 2018/0260474 A1* | 9/2018 | Surdeanu | G06F 16/951 |
| 2018/0365258 A1* | 12/2018 | Huang | G06N 5/04 |
| 2019/0034424 A1* | 1/2019 | Alvares | H04L 67/1044 |

FOREIGN PATENT DOCUMENTS

| | | |
|---|---|---|
| CN | 101377777 A | 3/2009 |
| CN | 102439595 A | 5/2012 |
| CN | 103124980 A | 5/2013 |
| CN | 104471568 A | 3/2015 |
| CN | 107257970 A | 10/2017 |

OTHER PUBLICATIONS

Choi, et al., "Coarse-to-Fine Question Answering for Long Documents", In Proceedings of Annual Meeting of Association for Computational Linguistics, Jun. 20, 2017, 11 pages.

"Disruption ahead", https://www2.deloitte.com/content/dam/Deloitte/us/Documents/about-deloitte/us-ibm-watson-client.pdf, Published on: Mar. 2015, pp. 1-33.

Hermann, et al., "Teaching Machines to Read and Comprehend", In Proceedings of 28th International Conference on Neural Information Processing Systems, Dec. 7, 2015, pp. 1-9.

Yu, et al., "Deep Learning for Answer Sentence Selection", In Journal of Computing Research Repository, Dec. 2014, pp. 1-9.

Iyyer, et al., "A Neural Network for Factoid Question Answering over Paragraphs", In Proceedings of Conference on Empirical Methods in Natural Language Processing, Oct. 25, 2014, 12 pages.

"First Office Action and Search report Issued in Chinese Patent Application No. 201880072527.1", dated Oct. 26, 2021, 10 Pages.

"Office Action Issued in European Patent Application No. 18807171.6", dated Jan. 5, 2022, 8 Pages.

"Second Office Action Issued in Chinese Patent Application No. 201880072527.1", dated May 30, 2022, 7 Pages.

"Office Action Issued in Indian Patent Application No. 202017019477", dated Jun. 7, 2022, 7 Pages.

* cited by examiner

MACHINE READING COMPREHENSION SYSTEM FOR ANSWERING QUERIES RELATED TO A DOCUMENT

BACKGROUND

Comprehension of natural language by machines, at a near-human level, is a major goal for Artificial Intelligence. Indeed, most human knowledge is collected in the natural language of text. Machine comprehension of unstructured, real-world text has therefore garnered significant attention from scientists, engineers, and scholars. This is due, at least in part, to the fact that many natural language processing tasks, such as information extraction, relation extraction, text summarization, or machine translation, depend implicitly or explicitly on a machine's ability to understand and reason with natural language.

In some instances, a machine reading comprehension system (MRCS) analyzes a document to predict an answer to a query. Many MRCSs analyze or operate on smaller documents that contain a limited number of pages (e.g., one or two pages). One example of such a document is a news article. It can be difficult for a MRCS to process a document that contains multiple or many pages (e.g., tens to hundreds of pages). First, training a MRCS to process larger documents can take a significant amount of time and data. Second, once the MRCS is trained, analyzing a larger document can require substantial processing capabilities and a considerable amount of time.

It is with respect to these and other general considerations that embodiments have been described. Also, although relatively specific issues have been discussed, it should be understood that the embodiments should not be limited to solving the specific issues identified in the background.

SUMMARY

Embodiments described herein provide a machine reading comprehension system that can analyze a larger document (e.g., two, five, ten, twenty, fifty, or one hundred pages) to predict an answer to a query. In one aspect, a system includes first processing circuitry, second processing circuitry, third processing circuitry, and one or more storage devices. The storage device(s) store instructions, that when executed by the first, the second, and the third processing circuitry, cause the machine reading comprehension system to perform a method. The method includes dividing a document into multiple sections that each comprise a portion of the document in response to a received query, processing, by the first processing circuitry, each section separately to determine a first score that indicates the section provides an answer to the received query, and processing, by the second processing circuitry, each section separately to determine a second score that indicates the section provides an answer to the received query. For each section, the first and the second scores are combined to produce a final score. Each section in a subset of the processed sections is processed separately by the third processing circuitry to determine a third score that indicates the section provides an answer to the query. Each section in the subset of the processed sections is included in the subset of the processed sections based on a ranking of the final scores. A predicted answer to the received query is then determined based on each third score.

In another aspect, a method includes dividing a document into multiple sections that each comprise a portion of the document in response to a received query, processing each section separately to determine a first score that indicates the section provides an answer to the received query, and processing each section separately to determine a second score that indicates the section provides an answer to the received query. For each section, the first and the second scores are combined to produce a final score. Each section in a subset of the processed sections is processed separately to determine a third score that indicates the section provides an answer to the query, where each section in the subset of the processed sections is included in the subset of the processed sections based on a ranking of the final scores. A predicted answer to the received query is then determined based on each third score.

In yet another aspect, a method includes dividing a document into multiple sections that each comprise a portion of the document in response to a received query, processing, by first processing circuitry, each section separately to determine a first score that indicates the section provides an answer to the received query, and processing, by second processing circuitry, each section separately to determine a second score that indicates the section provides an answer to the received query. For each section, the first and the second scores are combined to produce a final score. Each section in a subset of sections is processed separately to determine if a section provides an answer to the query, where each section in the subset of sections is included in the subset of sections based on a ranking of the final scores. The processing of each section in the subset includes separating the section into sentences, separating each sentence into words, encoding, by third processing circuitry, each sentence in the section and the received query, processing, by fourth processing circuitry, the encoded sentences to determine one or more sentences in the section that are relevant to the encoded query, and for each of the one or more relevant sentences, comparing a relevant sentence to the encoded query to produce a third score. A predicted answer to the received query is then selected based on each third score.

In an example embodiment, each section is processed separately by a first processing circuitry, a second processing circuitry, and a third processing circuitry. The first processing circuitry includes a neural network, the second processing circuitry includes an information retrieval (IR) system, and the third processing circuitry includes an embedded IR system. For each section in the document, the first, second, and third processing circuitries each compare the query to a section title and produce a score, and compare the query to a section description and produce a score another score. For each section, the scores are combined to provide a final score for the section. Once all of the sections have been analyzed, the sections are ranked by their final scores and a subset of the ranked sections are processed again by additional processing circuitry to determine a predicted answer to the query.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The disclosure will be readily understood by the following detailed description in conjunction with the accompanying drawings, wherein like reference numerals designate like structural elements, and in which.

Figure 1:
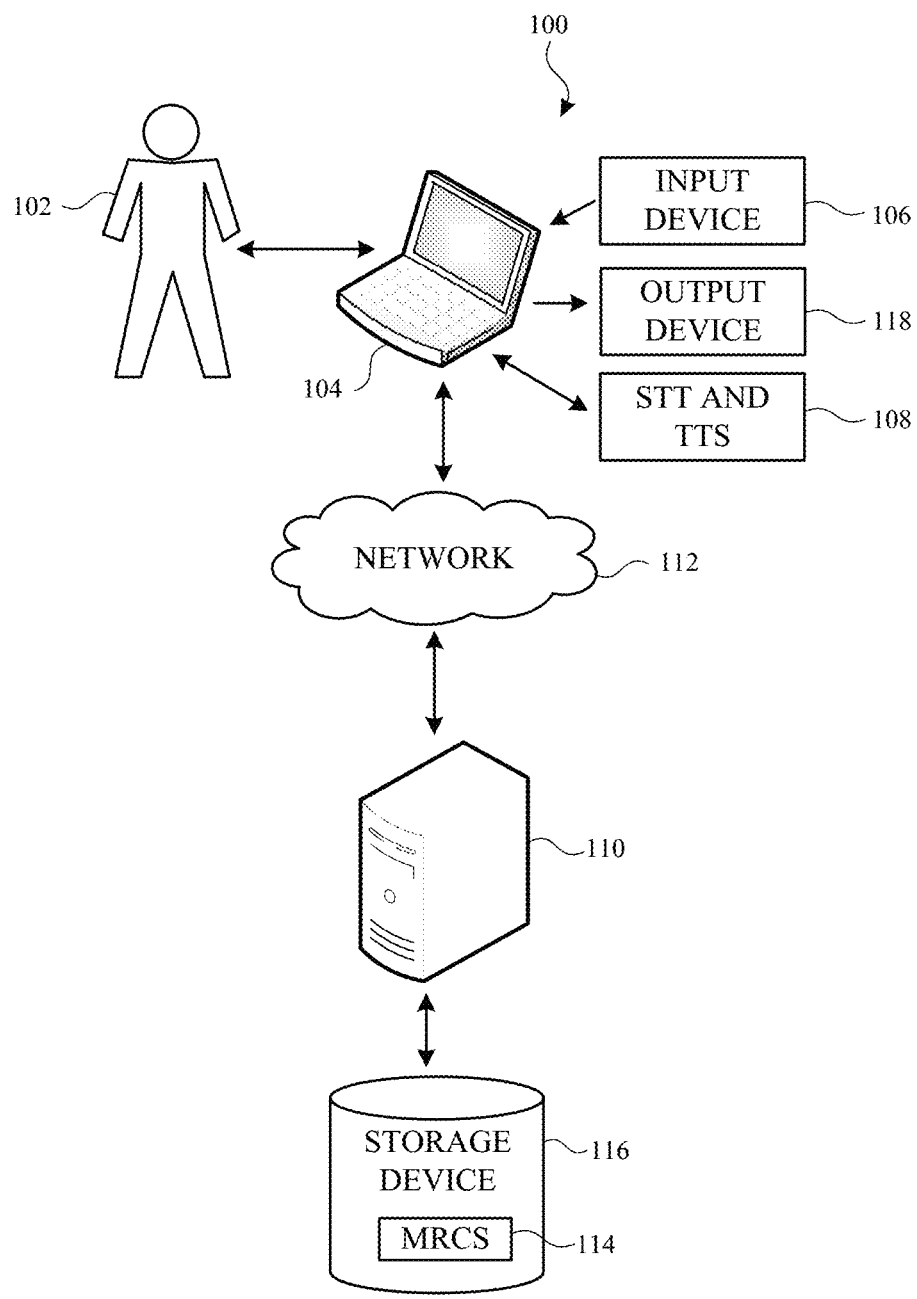
FIG. 1 illustrates an example system that can include a machine reading comprehension system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a machine reading comprehension system (MRCS) that can analyze a document to predict an answer to a query. In one embodiment, the document can be a large document that includes multiple or many pages. For example, the document can have tens to hundreds of pages. Examples of such documents include, but are not limited to, a book and a user's manual.

In a particular embodiment, a MRCS divides the document into multiple sections. Each section is processed separately by one or more processing circuitries to determine a score for that section. The score indicates how related the section is to the query and/or a probability that the section provides a possible answer to the query. Once all of the sections have been analyzed, the sections are ranked by their scores and a subset of the ranked sections are processed again to predict an answer to the query. In one embodiment, the subset of the ranked sections includes the section(s) that have the top M scores, where M is a number that is equal to or greater than one. For example, the subset of the ranked sections can include the sections associated with the top five scores. The predicted answer may then be provided to a computing device.

For example, in a representative embodiment, each section is processed separately by three processing circuitries. The first processing circuitry includes a neural network, the second processing circuitry includes an information retrieval (IR) system, and the third processing circuitry includes an embedded IR system. For each section in the document, the first, the second, and the third processing circuitries each compare the query to a section title and produce a score, and compare the query to a section description and produce another score. The scores are then combined to provide a final score for the section. Once all of the sections have been analyzed, the sections are ranked by their final scores and a subset of the ranked sections are processed again to predict an answer to the query. Other embodiments can use any suitable number of processing circuitries to analyze the sections (e.g., one processing circuitry or two or more processing circuitries).

These and other embodiments are discussed below with reference to FIGS. 1-9. However, those skilled in the art will readily appreciate that the detailed description given herein with respect to these Figures is for explanatory purposes only and should not be construed as limiting.

FIG. 1 illustrates an example system that can include a machine reading comprehension system. The system 100 allows a user 102 to submit a query associated with a document through a client-computing device 104. The client-computing device 104 may include, or be connected to, an input device 106 that receives the query. The query can be submitted as a written query (e.g., text) or as a spoken query (e.g., audio) that is converted to text (e.g., using a speech-to-text application (STT) 108). The input device 106 may be any suitable type of input device or devices configured to receive the query. In non-limiting examples, the input device 106 can be a keyboard (actual or virtual) and/or a microphone.

The client-computing device 104 is configured to access one or more server-computing devices (represented by server-computing device 110) through one or more networks (represented by network 112) to interact with a machine reading comprehension system (MRCS) 114 stored on one or more storage devices (represented by storage device 116). In one or more embodiments, the network 112 is illustrative of any suitable type of network(s), for example, an intranet and/or a distributed computing network (e.g., the Internet) over which the user 102 may communicate with other users and with other computing systems.

In some implementations, the MRCS 114 can include a computer-executable program or instructions that may be stored in the storage device 116 and executed by the server-computing device 110. As will be described in more detail later, the MRCS 114 processes the query and the document (via one or more processing systems or neural networks in the server-computing device 110) to predict an answer to the query. The prediction of the answer can cause the answer to be provided to the user 102 through an output device 118 that is in, or connected to, the client-computing device 104. In non-limiting examples, the output device 118 is a display that displays the predicted answer and/or a speaker that "speaks" the predicted answer (e.g., using a text-to-speech application (TTS) 108).

In one or more embodiments, the client-computing device 104 is a personal or handheld computing device having both the input and the output devices 106, 118. For example, the client-computing device 104 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list of example client-computing devices is for example purposes only and should not be considered as limiting. Any suitable client-computing device that provides and/or interacts with a MRCS may be utilized.

As should be appreciated, FIG. 1 is described for purposes of illustrating the present methods and systems and is not intended to limit the disclosure to a particular sequence of steps or a particular combination of hardware or software components.

Figure 2:
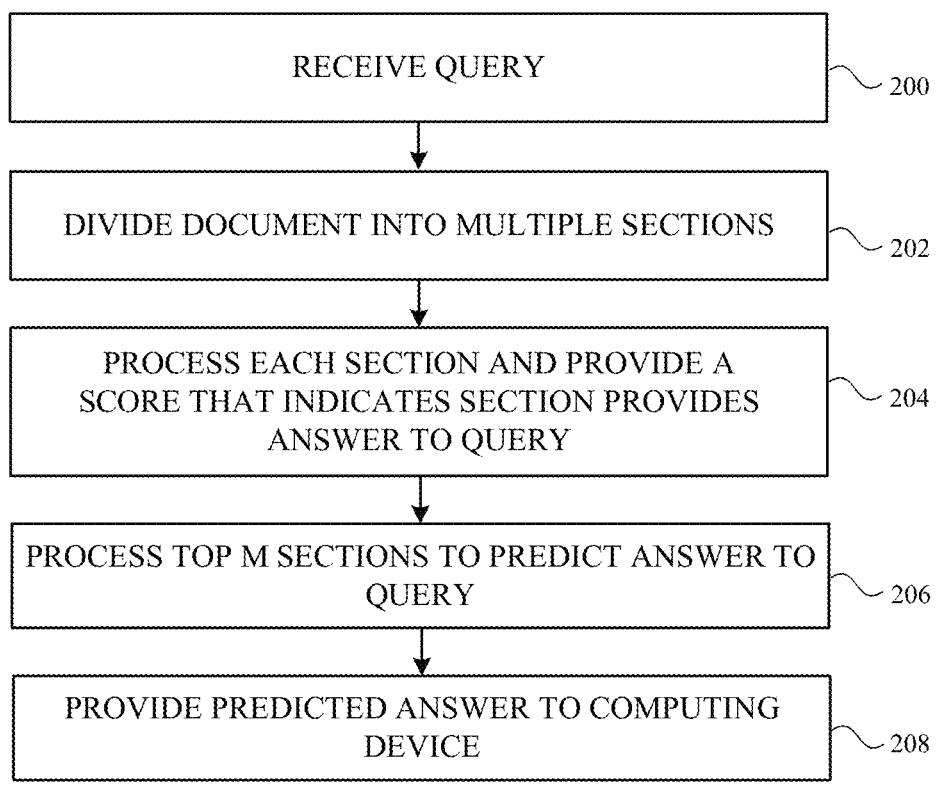
FIG. 2 is a flowchart depicting a method of operating a machine reading comprehension system to predict an answer to a query.

FIG. 2 is a flowchart depicting a method of operating a machine reading comprehension system to predict an answer to a query. Initially, a query that is related to a document is received at block 200. Any suitable type of document can be used including, but not limited to, relatively large documents such as a book (e.g., a textbook) or a user's manual. In response to the received query, the document associated with the query is divided or separated into multiple sections with each section including a portion of the document (block 202). The sections can be chapters, one or more paragraphs, or sections that include multiple sentences. In one embodiment, the sections are non-overlapping sections, although this is not required.

Each section is processed separately to determine a score that indicates the section provides an answer to the query (block 204). In one embodiment, the score is a probability that the section provides an answer to the query. Based on the determined scores (e.g., probabilities), a subset of the sections are then processed separately to predict an answer to the query (block 206). In one instance, the subset of the sections includes a set of the top M sections (e.g., the section(s) having the top M probabilities), where the variable M is a number that equals or exceeds one. For example, the subset of the sections may include the sections associated with the top five scores.

Thereafter, at block 208, the predicted answer to the query is provided to a computing device. The computing device can be any suitable computing device, such as a client-computing device (e.g., client-computing device 104 in FIG. 1). The predicted answer can be presented (or caused to be presented) to a user via an output device in response to the receipt of the predict answer. For example, the predicted answer can be displayed on a display to present the predicted answer visually to the user, or the predicted answer may be provided to one or more speakers to present the predicted answer audibly to the user.

Figure 3:
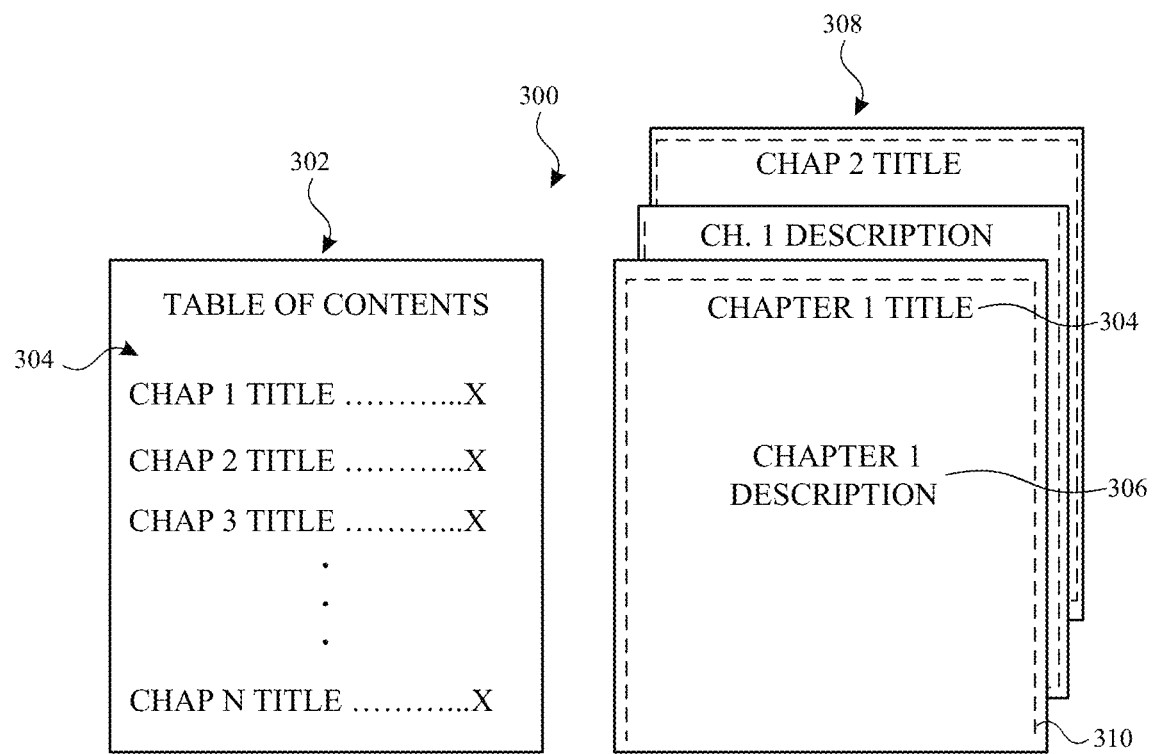
FIG. 3 illustrates an example document and sections in the document.

FIG. 3 illustrates an example document and sections in the document. As described earlier, the document can be a large document that includes multiple pages. For example, the document can have two, five, ten, twenty, fifty, or one hundred or more pages. In the illustrated embodiment, the document 300 includes a table of contents 302 that lists the chapter titles 304 in the document 300. Each chapter includes the chapter title 304 and a chapter description 306 that is associated with the chapter title 304. Each chapter description 306 can be recorded in one or more pages 308 of the document 300. In this example, a section 310 includes a section title (e.g., a chapter title 304) and the associated section description (e.g., chapter description 306). In other embodiments, a document can include sections that are formatted differently from the sections shown in FIG. 3. For example, each section may not have a section title. Additionally or alternatively, a section description may include one or more paragraphs or a span of sentences, where the paragraphs or the span of sentences are not associated with a chapter (e.g., a chapter in a book).

Figure 4:
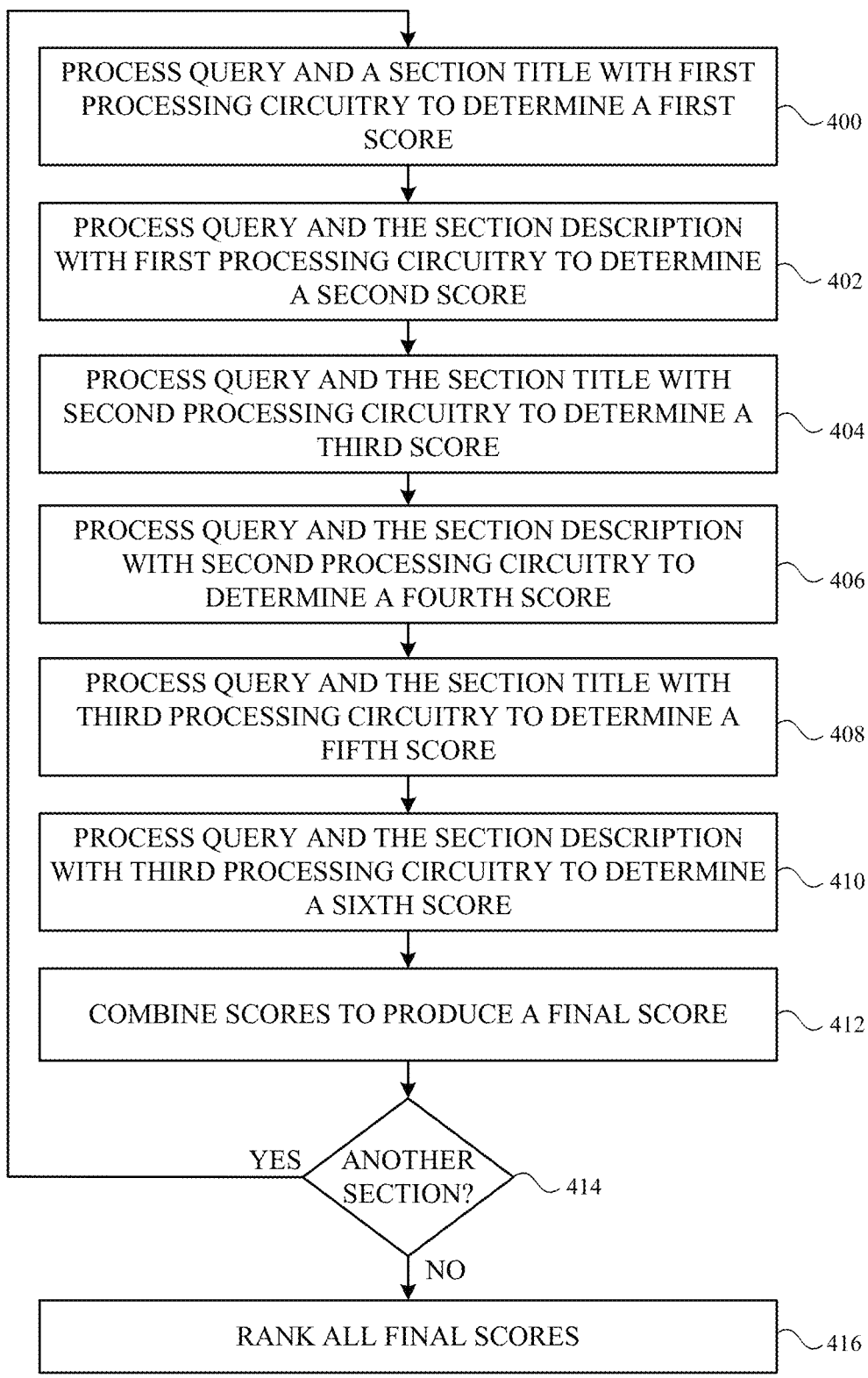
FIG. 4 is a flowchart depicting an example method of processing the sections in a document.

FIG. 4 is a flowchart depicting a method of processing the sections in a document. The process can be used in block 204 in the method shown in FIG. 2. Initially, as shown in block 400, the query and a section title are processed separately by first processing circuitry to determine a first score. The first processing circuitry may encode the query and the section title and compare the encoded query and the encoded section title to determine how well the section title relates to the query. A lower score indicates the section title is not that related to the query while a higher score indicates the section title is more relevant to the query.

Next, as shown in block 402, the query and the section description are processed separately by the first processing circuitry to determine a second score. The first processing circuitry can encode the query and the section description and compare the encoded query and the encoded section description to determine how well the section description relates to the query. Like the first score, the second score indicates how relevant the section description is to the query. In one embodiment, the first processing circuitry includes a neural network, such as a recurrent neural network.

Thereafter, the query and the section title are processed separately by second processing circuitry to determine a third score (block 404). The query and the section description are also processed separately by the second processing circuitry to determine a fourth score (block 406). In one embodiment, the second processing circuitry analyzes the query and the section title to determine how similar the section title is to the query and produces the third score that represents the similarity. Similarly, the second processing circuitry analyzes the query and the section description to determine how similar the section description is to the query and produces the fourth score that represents the similarity. For example, the third score and the fourth score can each be a matching score that indicates how well the query matches the section title and the section description, respectively. In one embodiment, the second processing circuitry includes an information retrieval (IR) system. Any suitable IR process can be used. One example of an IR process is the BM25 probabilistic system.

Next, as shown in block 408, the query and the section title are processed separately by third processing circuitry to determine a fifth score. The query and the section description are also processed separately by the third processing circuitry to determine a sixth score (block 410). In one embodiment, the third processing circuitry includes an embedded IR system, although any suitable IR system or neural network can be used. The fifth score indicates how well the section title relates to or matches the query and the sixth score indicates how well the section description relates to or matches the query.

In one aspect, the embedded IR system analyzes each word in the query and in the section title as separate words and compares the cosine similarities between the word embeddings in the query and in the section title. For example, for each word in the query, the embedded IR system determines the most similar word in the section title based on the cosine similarity between the word embeddings and produces the fifth score based on the most similar words in the query and the section title. The embedded IR system performs the same analysis between the query and the section description to produce the sixth score.

The six scores are combined at block 412 to produce a final score for the section. In one embodiment, the six scores are concatenated to produce a vector that represents the final score for the section. A determination is then made at block 414 as to whether another section needs to be processed. If so, the method returns to block 400 and blocks 400, 402, 404, 406, 408, 410, 412 and 414 repeat until all of the sections are processed.

If the determination at block 414 is that another section does not need to be processed (e.g., all of the sections are processed), the method continues at block 416 where all of the final scores are ranked. In one embodiment, the final scores are ranked by determining a probability distribution over all of the final scores. Any suitable technique may be used to determine the probability distribution over the final scores. For example, in one aspect, a softmax process is used to produce the probability distribution. The softmax process can be a layer, such as the final layer, of a neural network.

Although the method shown in FIG. 4 is described in conjunction with three processing circuitries analyzing the sections in a document, other embodiments are not limited to this implementation. Any suitable number of processing circuitries may be used. For example, one, two, or four processing circuitries can analyze the sections in a document. Thus, the number of scores combined at block 412 depends on the number of processing operations that are performed. Additionally or alternatively, different types of processing circuitries may be used in other embodiments. In some embodiments, the order of the blocks depicted in FIG. 4 can be modified. For example, block 400 can occur after block 402 and/or block 404 may be performed after block 406.

Figure 5:
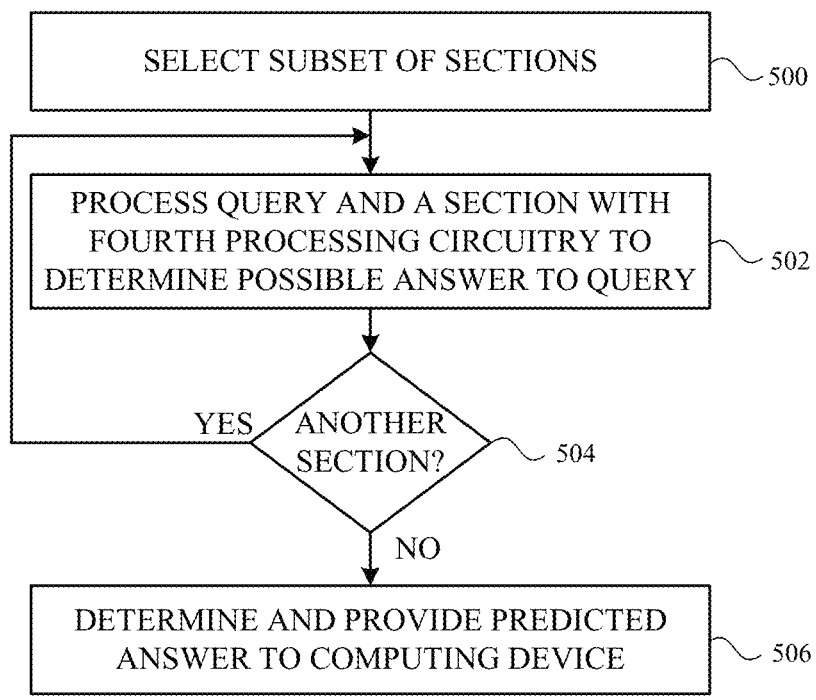
FIG. 5 is a flowchart illustrating an example method of processing a subset of the processed sections to predict an answer to the query.

FIG. 5 is a flowchart illustrating a method of processing a subset of the processed sections to predict an answer to the query. The illustrated process can be used in blocks 206 and 208 in the method shown in FIG. 2. Initially, as shown in block 500, a subset of the sections is selected for further processing. In one embodiment, the section(s) having final scores that fall within the top M of the ranked final scores are selected, where M is a number equal to or greater than one. In embodiments where a probability distribution is determined over all of the final scores, the section(s) associated with the top M probabilities are selected at block 500. For example, the sections associated with the top three final scores or top three probabilities can be selected at block 500.

A selected section and the query are then processed by fourth processing circuitry to determine one or more possible answers to the query (block 502). In one embodiment, the fourth processing circuitry includes a neural network for reading comprehension that encodes the query, encodes the section title, and encodes the section description, and compares the encoded query to the encoded section title and to the encoded section description. The fourth processing circuitry produces one or more possible answers to the query and a score or probability for each possible answer that indicates the correctness or probability that the possible answer is the answer to the query. Example neural networks that are suitable for use as the fourth processing circuitry include, but are not limited to, R-NET, BiDAF, ReasoNet, Coattention, and Dynamic Coattention.

A determination is then made at block 504 as to whether another selected section needs to be processed. If so, the method returns to block 502. If the determination is that another selected section does not need to be processed, the method continues at block 506 where a predicted answer is determined from the possible answers and the predicted answer is provided to a computing device. In one aspect, the predicted answer is the possible answer that has the highest score or probability that was computed by the fourth processing circuitry.

Figure 6:
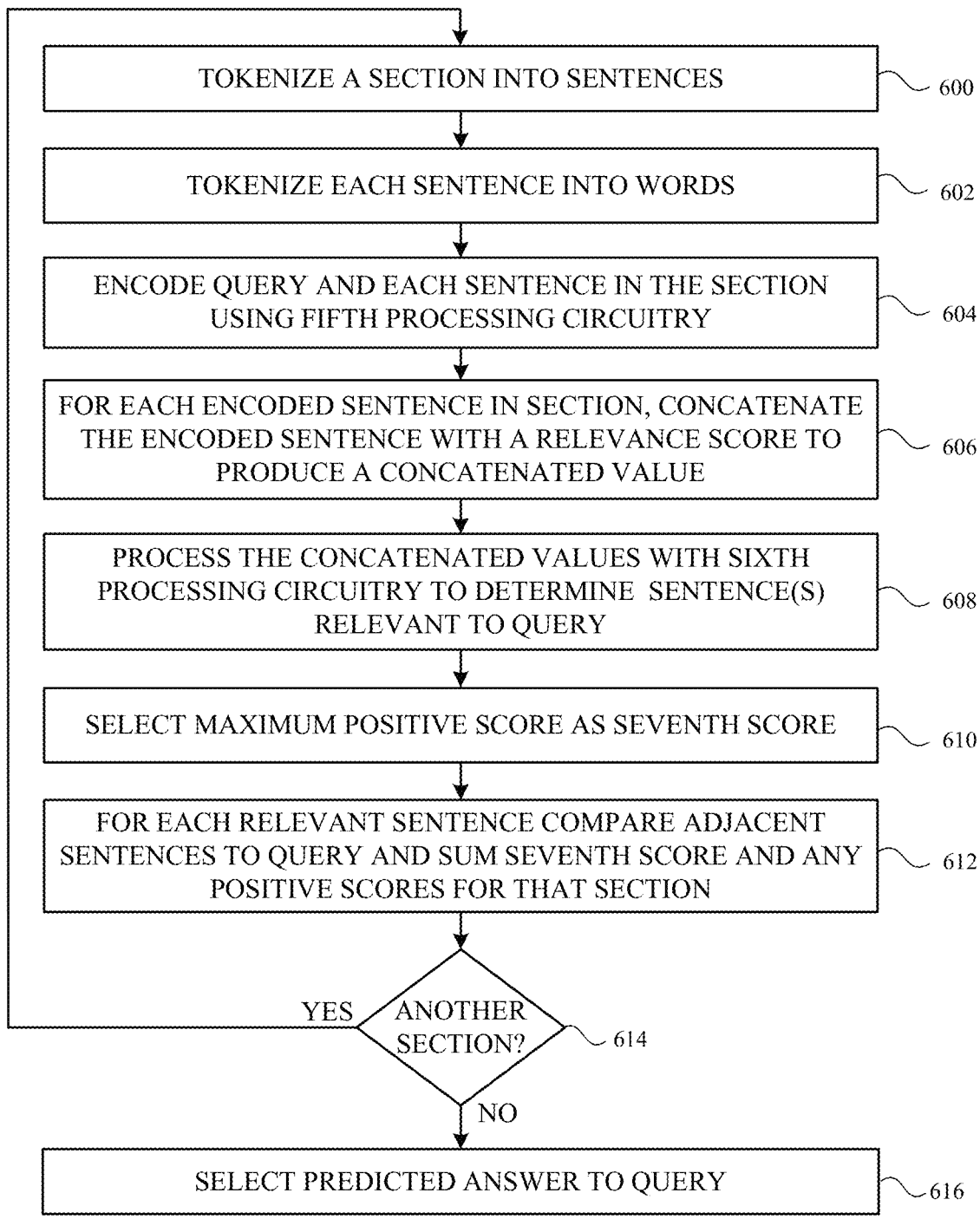
FIG. 6 is a flowchart illustrating an example method of determining an answer to the query.

FIG. 6 is a flowchart illustrating an example method of determining an answer to the query. The representative process can be used in blocks 502, 504, and 506 in the method shown in FIG. 5. Initially, a section is tokenized or separated into sentences at block 600. In one embodiment, the section is the section having the top ranked final score in the selected M sections (see e.g., block 500 in FIG. 5).

Each sentence in the section is then tokenized or separated into words at block 602. The query and each sentence are then encoded using fifth processing circuitry (block 604). In one aspect, the fifth processing circuitry includes a neural network, such as a recurrent neural network. Next, as shown in block 606, for each encoded sentence in the section, the sentence is concatenated with a relevance score to produce a concatenated value. In one embodiment, the relevance score is an inverse-sentence frequency (ISF) score, although other embodiments can use a different type of relevance score. For example, an example equation for computing an ISF score is as follows:

$$ISF(d, q) = \sum_k \frac{\max_j 1(d_{ij} = q_k)}{\max\left(1, \sum_i \max_j 1(d_{ij} = q_k)\right)}, \quad \text{Equation (1)}$$

where $d_{ij}$ is the j-th token in the i-th sentence of the document d, $q_k$ is the k-th token in query q, and $1(x=y)$ is 1 when $x=y$ or otherwise is 0.

The concatenated values are then processed using sixth processing circuitry to determine one or more sentences that are relevant to the query (block 608). In some aspects, the sixth processing circuitry is a neural network, such as a recurrent neural network, that processes the sentences (e.g., has a hidden state for each sentence) and processes the words in the sentence to determine whether one or more sentences is relevant to the query.

In one embodiment, the sixth processing circuitry compares the encoded query to each encoded sentence and produces a positive sentence relevance score or a negative sentence relevance score for each sentence. For example, the encoded query may be compared to the output of each hidden state for the encoded sentences using a dot product to produce a sentence relevance score. The sentence relevance score indicates how relevant the sentence is to the query, where a negative sentence relevance score indicates the sentence is not relevant to the query and a positive sentence relevance score indicating the sentence is relevant to the query (the higher the positive sentence relevance score the more relevant the sentence is to the query).

Next, as shown in block 610, the maximum positive sentence relevance score is selected as a seventh score. For each relevant sentence (e.g., sentence with a positive sentence relevance score), the encoded sentence(s) adjacent to the relevant sentence are compared with the encoded query to determine if any of the adjacent sentences are associated with a positive sentence relevance score (block 612). The comparison of an adjacent encoded sentence to the encoded query continues until a negative sentence relevance score is obtained. For example, an encoded sentence that precedes an initial encoded sentence in the section that has a positive sentence relevance score is compared with the encoded query and if the preceding encoded sentence has a positive sentence relevance score, the next preceding sentence is compared. This process repeats until a negative sentence relevance score is obtained. When a negative sentence relevance score is obtained, the sentence subsequent to the initial encoded sentence is compared with the encoded query and if the subsequent encoded sentence has a positive sentence relevance score, the next subsequent sentence is compared. This process also repeats until a negative sentence relevance score is obtained. When the comparison operations are completed, the seventh score and the positive sentence relevance scores are summed to produce a summed positive score for that section.

A determination is then made at block 614 as to whether another section in the M selected sections needs to be processed. If so, the method returns to block 600 and blocks 600, 602, 604, 606, 608, 610, 612 and 614 repeat. If the determination at block 614 is that another section does not need to be processed, the method passes to block 616 where the answer associated with the highest summed positive score is selected as the predicted answer to the query.

Embodiments are not limited to the order and/or the blocks shown in FIG. 6. Blocks can be omitted, rearranged, or new blocks added to the process depicted in FIG. 6. For example, block 612 may be omitted in other embodiments.

Figure 7:
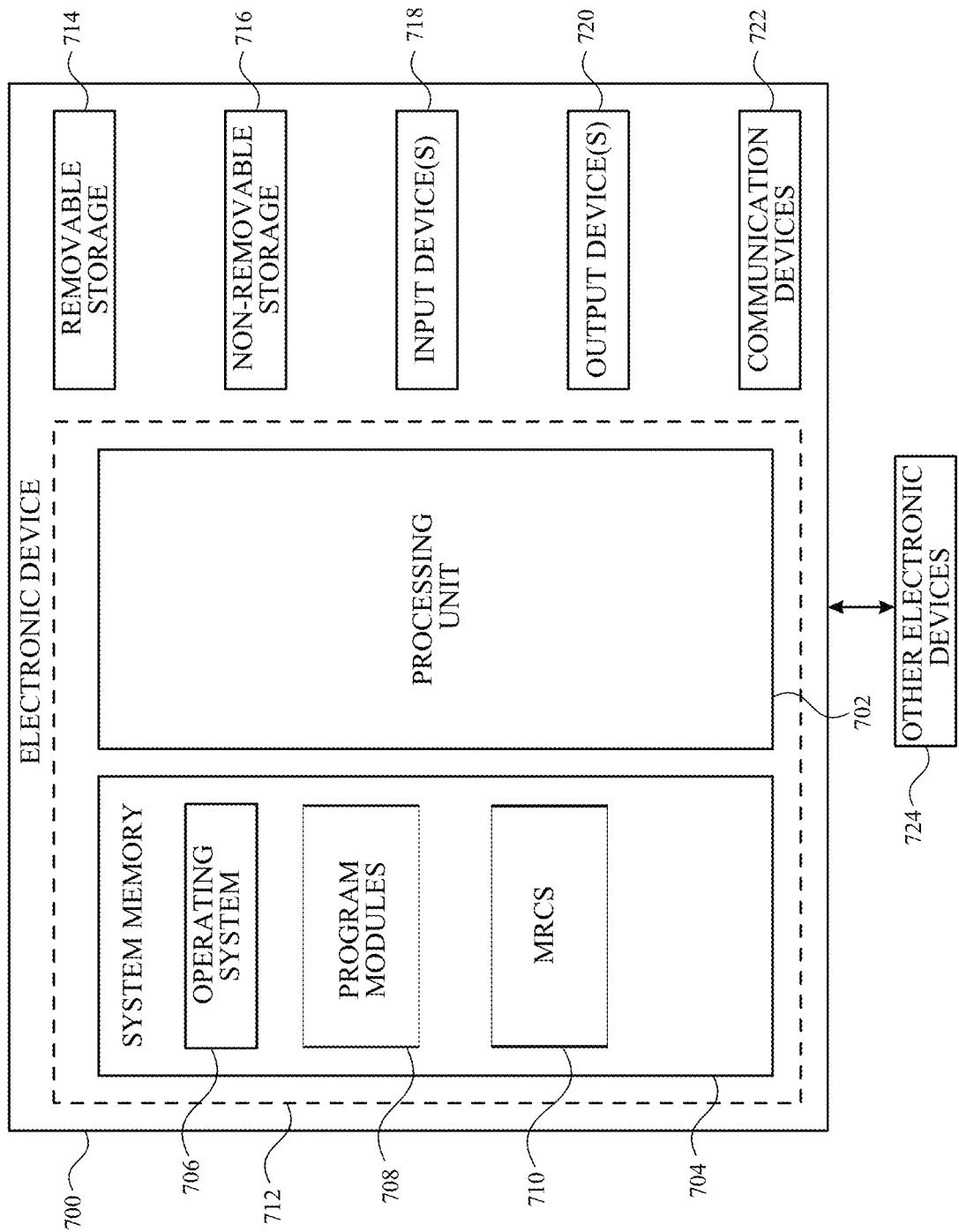
FIG. 7 is a block diagram depicting example physical components of an electronic device with which aspects of the disclosure may be practiced.
Figure 8A:
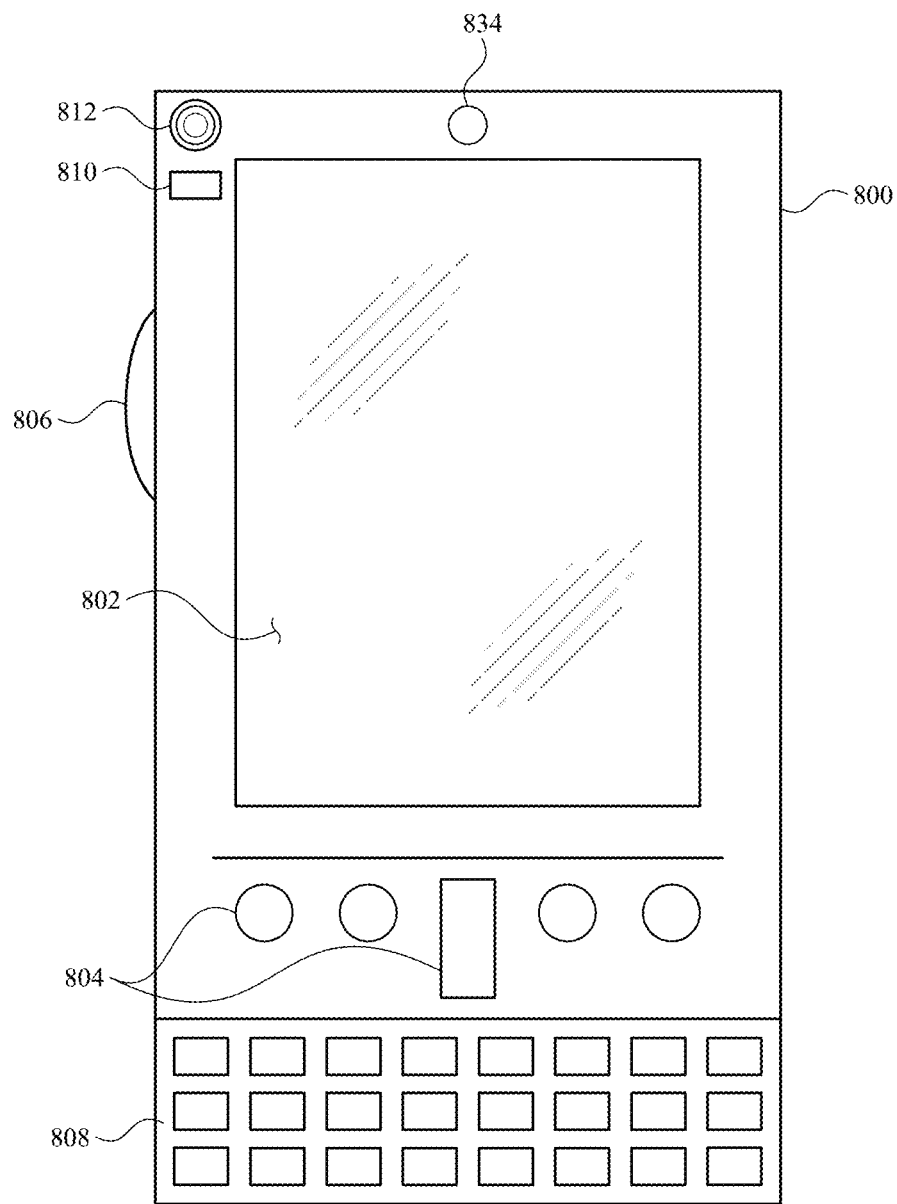
FIGS. 8A-8B are simplified block diagrams illustrating a mobile computing device with which aspects of the present disclosure may be practiced.
Figure 8B:
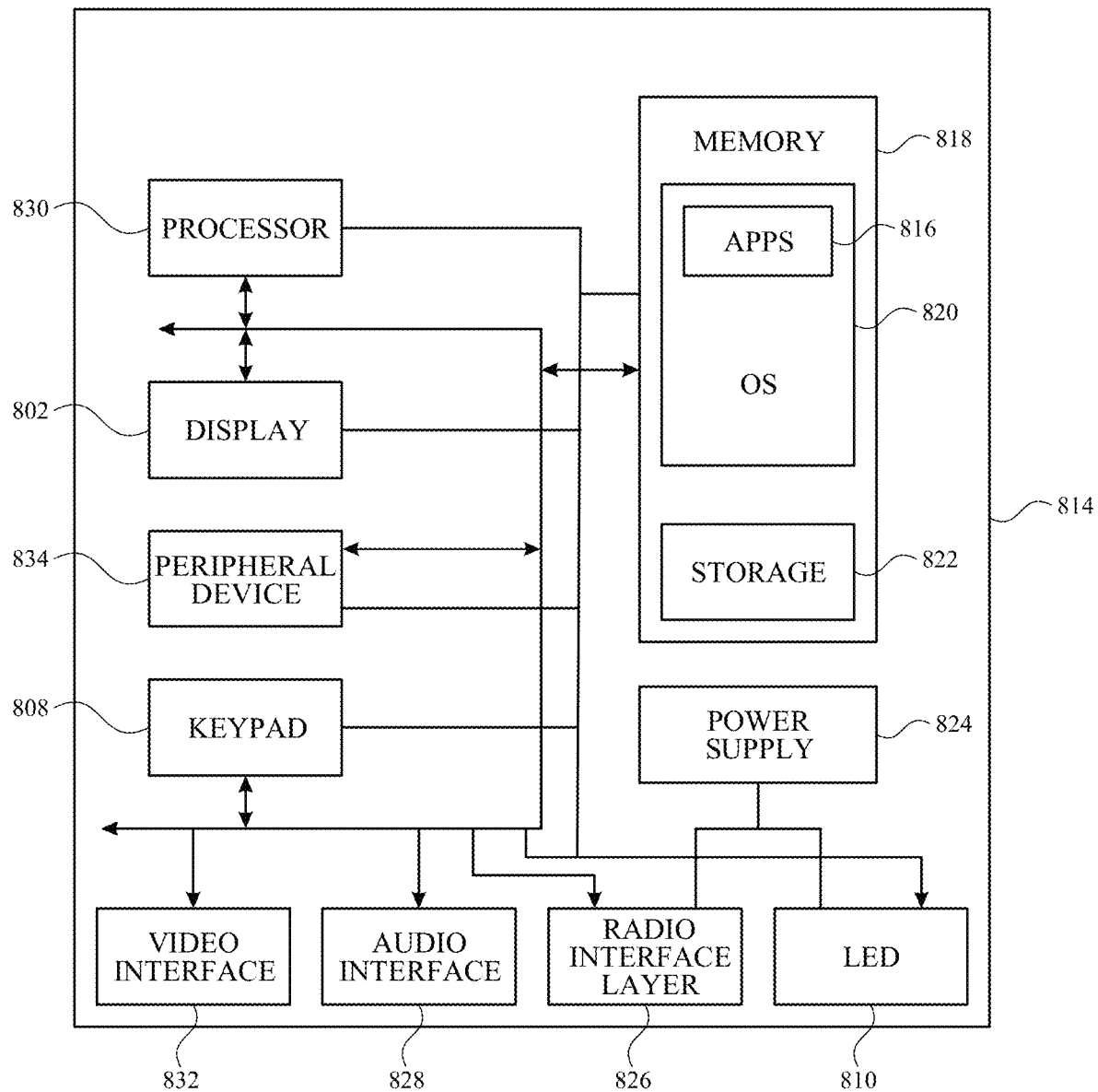
Figure 9:
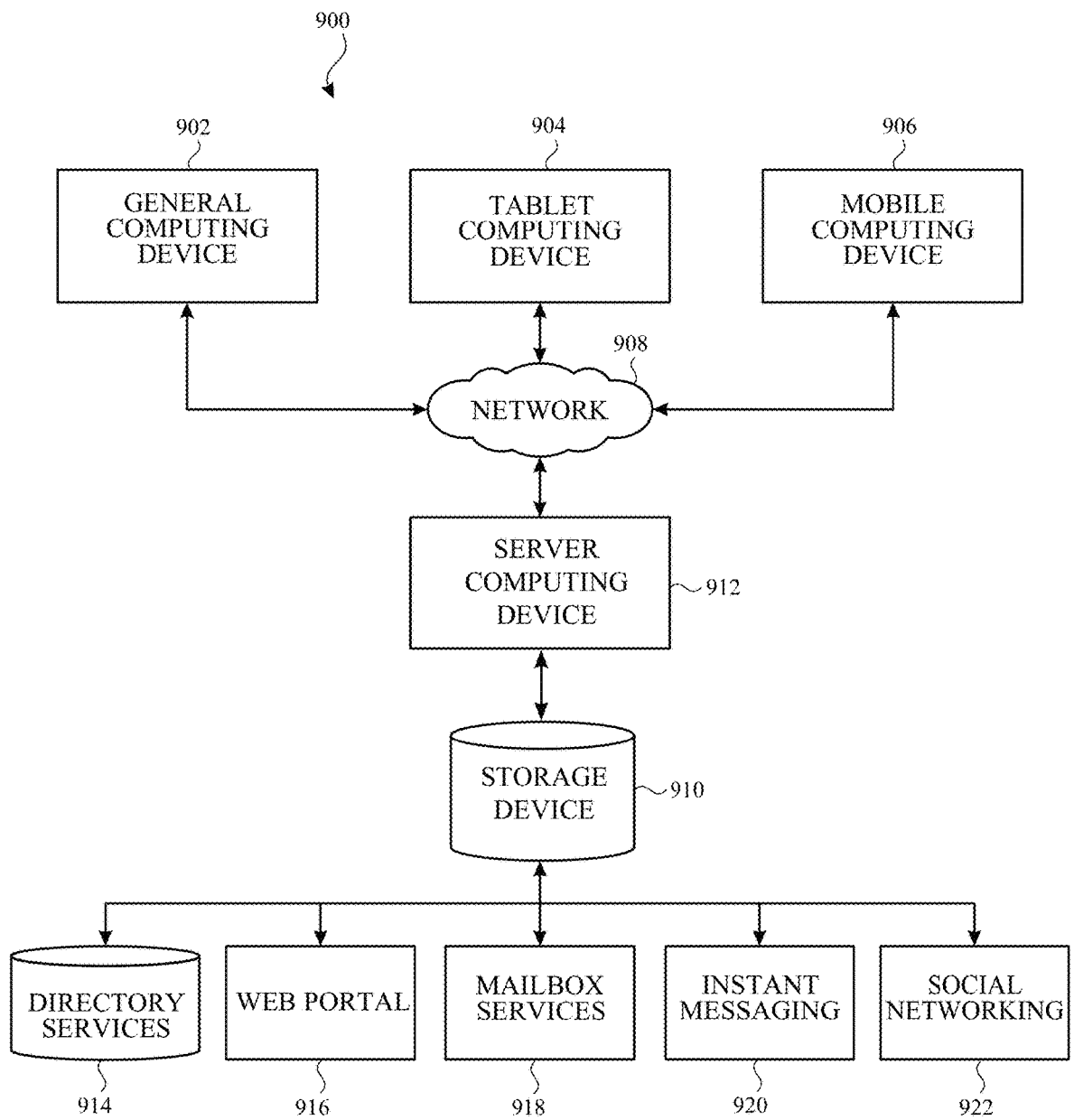
FIG. 9 is a block diagram depicting a distributed computing system in which aspects of the present disclosure may be practiced.

FIGS. 7-9 and the associated descriptions provide a discussion of a variety of operating environments in which aspects of the disclosure may be practiced. However, the devices and systems illustrated and discussed with respect to FIGS. 7-9 are for purposes of example and illustration and are not limiting of a vast number of electronic device configurations that may be utilized for practicing aspects of the disclosure, as described herein.

FIG. 7 is a block diagram illustrating physical components (e.g., hardware) of an electronic device 700 with which aspects of the disclosure may be practiced. The components described below may be suitable for the computing devices described above, including the client-computing device 104 and/or the server-computing device 110 in FIG. 1.

In a basic configuration, the electronic device 700 may include at least one processing unit 702 and a system memory 704. Depending on the configuration and type of the electronic device, the system memory 704 may comprise, but is not limited to, volatile storage (e.g., random access memory), non-volatile storage (e.g., read-only memory), flash memory, or any combination of such memories. The system memory 704 may include a number of program modules and data files, such as an operating system 706, one or more program modules 708 suitable for parsing received input, determining subject matter of received input, determining actions associated with the input and so on, and a MRCS 710. While executing on the processing unit 702, the instructions in the MRCS 710 may perform and/or cause to be performed processes including, but not limited to, the aspects as described herein.

The operating system 706, for example, may be suitable for controlling the operation of the electronic device 700. Furthermore, embodiments of the disclosure may be practiced in conjunction with a graphics library, other operating systems, or any other application program and is not limited to any particular application or system. This basic configuration is illustrated in FIG. 7 by those components within a dashed line 712.

The electronic device 700 may have additional features or functionality. For example, the electronic device 700 may also include additional data storage devices (removable and/or non-removable) such as, for example, magnetic disks, optical disks, or tape. Such additional storage is illustrated in FIG. 7 by a removable storage device 714 and a non-removable storage device 716.

The electronic device 700 may also have one or more input device(s) 718 such as a keyboard, a trackpad, a mouse, a pen, a sound or voice input device, a touch, force and/or swipe input device, etc. The output device(s) 720 such as a display, speakers, a printer, etc. may also be included. The aforementioned devices are examples and others may be used. The electronic device 700 may include one or more communication devices 722 allowing communications with other electronic devices 724. Examples of suitable communication devices 722 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 714, and the non-removable storage device 716 are all computer storage media examples (e.g., memory storage or storage device). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 700. Any such computer storage media may be part of the electronic device 700. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality described herein may be operated via application-specific logic integrated with other components of the electronic device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

FIGS. 8A and 8B illustrate a mobile electronic device 800, for example, a mobile telephone, a smart phone, wearable computer (such as a smart watch), a tablet computer, a laptop computer, and the like, with which embodiments of the disclosure may be practiced. With reference to FIG. 8A, one aspect of a mobile electronic device 800 for implementing the aspects is illustrated.

In a basic configuration, the mobile electronic device 800 is a handheld computer having both input elements and output elements. The mobile electronic device 800 typically includes a display 802 and one or more input buttons 804 that allow the user to enter information into the mobile electronic device 800. The display 802 of the mobile electronic device 800 may also function as an input device (e.g., a display that accepts touch and/or force input).

If included, an optional side input element 806 allows further user input. The side input element 806 may be a rotary switch, a button, or any other type of manual input element. In alternative aspects, mobile electronic device 800 may incorporate more or less input elements. For example, the display 802 may not be a touch screen in some embodiments. In yet another alternative embodiment, the mobile electronic device 800 is a portable phone system, such as a cellular phone. The mobile electronic device 800 may also include an optional keypad 808. Optional keypad 808 may be a physical keypad or a "soft" keypad generated on the touch screen display.

In various embodiments, the output elements include the display 802 for showing a graphical user interface (GUI), a visual indicator 810 (e.g., a light emitting diode), and/or an audio transducer 812 (e.g., a speaker). In some aspects, the mobile electronic device 800 incorporates a vibration transducer for providing the user with tactile feedback. In yet another aspect, the mobile electronic device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of a mobile electronic device 800. That is, the mobile electronic device 800 can incorporate a system (e.g., an architecture) 814 to implement some aspects. In one embodiment, the system 814 is implemented as a "smart phone" capable of running one or more applications (e.g., browser, e-mail, calendaring, contact managers, messaging clients, games, media clients/players, content selection and sharing applications and so on). In some aspects, the system 814 is integrated as an electronic device, such as an integrated personal digital assistant (PDA) and wireless phone.

One or more application programs (APPS) 816 may be loaded into the memory 818 and run on or in association with the operating system 820. Examples of the application programs include phone dialer programs, e-mail programs, personal information management (PIM) programs, word processing programs, spreadsheet programs, Internet browser programs, messaging programs, and so forth. The system 814 also includes a non-volatile storage area 822 within the memory 818. The non-volatile storage area 822 may be used to store persistent information that should not be lost if the system 814 is powered down.

The application programs 816 may use and store information in the non-volatile storage area 822, such as documents, email, attachments or other messages used by an email application, and the like. A synchronization application (not shown) also resides on the system 814 and is programmed to interact with a corresponding synchronization application resident on a host computer to keep the information stored in the non-volatile storage area 822 synchronized with corresponding information stored at the host computer.

The system 814 has a power supply 824, which may be implemented as one or more batteries. The power supply 824 may further include an external power source, such as an AC adapter or a powered docking cradle that supplements or recharges the batteries.

The system 814 may also include a radio interface layer 826 that performs the function of transmitting and receiving radio frequency communications. The radio interface layer 826 facilitates wireless connectivity between the system 814 and the "outside world," via a communications carrier or service provider. Transmissions to and from the radio interface layer 826 are conducted under control of the operating system 820. In other words, communications received by the radio interface layer 826 may be disseminated to the application programs 816 via the operating system 820, and vice versa.

The visual indicator 810 may be used to provide visual notifications, and/or an audio interface 828 may be used for producing audible notifications via an audio transducer (e.g., audio transducer 812 illustrated in FIG. 8A). In the illustrated embodiment, the visual indicator 810 is a light emitting diode (LED) and the audio transducer 812 may be a speaker. These devices may be directly coupled to the power supply 824 so that when activated, they remain on for a duration dictated by the notification mechanism even though the processor 830 and other components might shut down for conserving battery power. The LED may be programmed to remain on indefinitely until the user takes action to indicate the powered-on status of the device.

The audio interface 828 is used to provide audible signals to and receive audible signals from the user (e.g., voice input such as described above). For example, in addition to being coupled to the audio transducer 812, the audio interface 828 may also be coupled to a microphone to receive audible input, such as to facilitate a telephone conversation. The system 814 may further include a video interface 832 that enables an operation of peripheral device 834 (e.g., on-board camera) to record still images, video stream, and the like.

A mobile electronic device 800 implementing the system 814 may have additional features or functionality. For example, the mobile electronic device 800 may also include additional data storage devices (removable and/or non-removable) such as, magnetic disks, optical disks, or tape. Such additional storage is illustrated in FIG. 8B by the non-volatile storage area 822.

Data/information generated or captured by the mobile electronic device 800 and stored via the system 814 may be stored locally on the mobile electronic device 800, as described above, or the data may be stored on any number of storage media that may be accessed by the device via the radio interface layer 826 or via a wired connection between the mobile electronic device 800 and a separate electronic device associated with the mobile electronic device 800, for example, a server-computing device in a distributed computing network, such as the Internet (e.g., server-computing device 110 in FIG. 1). As should be appreciated such data/information may be accessed via the mobile electronic device 800 via the radio interface layer 826 or via a distributed computing network. Similarly, such data/information may be readily transferred between electronic devices for storage and use according to well-known data/information transfer and storage means, including electronic mail and collaborative data/information sharing systems.

As should be appreciated, FIG. 8A and FIG. 8B are described for purposes of illustrating the present methods and systems and is not intended to limit the disclosure to a particular sequence of steps or a particular combination of hardware or software components.

FIG. 9 is a block diagram illustrating a distributed system in which aspects of the disclosure may be practiced. The system 900 allows a user to send and receive electronic communications that include one or more attachments through a general computing device 902 (e.g., a desktop computer), a tablet computing device 904, and/or a mobile computing device 906. The general computing device 902, the tablet computing device 904, and the mobile computing device 906 can each include the components, or be connected to the components, that are shown associated with the electronic device 700 in FIG. 7.

The general computing device 902, the tablet computing device 904, and the mobile computing device 906 are each configured to access one or more networks (represented by network 908) to interact with one or more programs (e.g., MRCS 114 in FIG. 1) stored in one or more storage devices (represented by storage device 910) and executed on one or more server-computing devices (represented by server-computing device 912). In some aspects, the server-computing device 912 can access and/or receive various types of services, communications, documents and information transmitted from other sources, such as directory services 914, web portal(s) 916, mailbox services 918, instant messaging stores and/or services 920, and/or social networking stores or services 922. In some instances, these sources may provide robust reporting, analytics, data compilation and/or storage service, etc., whereas other services may provide search engines or other access to data and information, images, videos, document processing and the like.

As should be appreciated, FIG. 9 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A machine reading comprehension system, comprising:
a processing circuitry; and
one or more storage devices for storing instructions, that when executed by the processing circuitry, cause the machine reading comprehension system to perform a method comprising:
in response to a received query that is related to a document, dividing the document into multiple sections that each comprise a portion of the document, wherein the dividing of the document into the multiple sections is based on a format, the document including one or more sections, each section comprising a span of sentences in the portion of the document, the each section comprising content and a description of the content, the content and the description of the content being distinct, and wherein the operation of combining the first and the second scores comprises concatenating the first and the second scores to produce a vector;
for each section:
determining, by the processing circuitry based on the received query and a respective section, a first score, wherein the first score indicates relevance of the received query to the respective section, and wherein the relevance is determined based at least upon an encoding of the received query and an encoding of a description of content of the respective section;
determining, by the processing circuitry based on the received query and the respective section, a second score, wherein the second score indicates a similarity of words between the received query and the description of content of the respective section; and
generating, based on the first and the second scores, a final score of the respective section;
determining, by the processing circuitry based on content of each section in a subset of the sections and the received query, a third score associated with each of one or more possible answers, wherein the third score indicates probability of the possible answer being an answer to the received query, wherein the third score for each section is based on a ranking of the final scores of the respective section;
determining a predicted answer to the received query based on each third score; and
providing the predicted answer.

2. The machine reading comprehension system of claim 1, wherein the processing circuitry comprises one of an information retrieval system or an embedded information retrieval system.

3. The machine reading comprehension system of claim 1, wherein the method further comprises providing the predicted answer to a computing device.

4. A method, comprising:
in response to a received query that relates to a document, dividing the document into multiple sections, wherein the dividing of the document into the multiple sections is based on a format, the document including one or more sections, each section comprising a span of sentences in a portion of the document, the each section comprising content and a description of the content, the content and the description of the content being distinct, and wherein the operation of combining the first and the second scores comprises concatenating the first and the second scores to produce a vector;
for each section:
determining, based on the received query and a respective section, a first score, wherein the first score indicates relevance of the received query to the respective section, and wherein the relevance is determined based at least upon an encoding of the received query and an encoding of a description of content of the respective section;

determining, based on the received query and the respective section, a second score, wherein the second score indicates a similarity of words between the received query and the description of content of the respective section; and generating, based on the first and the second scores, a final score of the respective section;

determining, based on content of each section in a subset of the sections and the received query, a third score associated with each of one or more possible answers, wherein the third score indicates probability of the possible answer being an answer to the received query, wherein the third score for each section is based on a ranking of the final scores of the respective section;

determining a predicted answer to the received query based on each third score; and providing the predicted answer.

5. The method of claim 4, further comprising providing the predicted answer to a computing device.

6. The method of claim 4, wherein the operation of combining the first and the second scores comprises concatenating the first and the second scores to produce a vector.

7. The method of claim 4, further comprising:
prior to combining the first and the second scores, processing the received query and the respective section to determine a fourth score that indicates the section provides the answer to the received query,
wherein the operation of combining the first and the second scores comprises combining the first, the second, and the fourth scores to produce the final score.

8. The method of claim 7, wherein the operation of combining the first, the second, and the fourth scores comprises concatenating the first, the second, and the fourth scores to produce a vector.

9. The method of claim 7, wherein:
the operation of processing the received query and the respective section to determine the first score that indicates the section provides the answer to the received query comprises processing, by a neural network, the received query and the respective section to determine the first score that indicates how relevant the section is to the received query;

the operation of processing the received query and the respective section to determine the second score that indicates the section provides the answer to the received query comprises processing, by an information retrieval system, the received query and the respective section to determine the second score that indicates how similar the received query is to the section; and the operation of processing the received query and the respective section to determine the fourth score that indicates the section provides the answer to the received query comprises processing, by an embedded information retrieval system, the received query and the respective section to determine the fourth score that indicates how related or similar the received query is to the section.

10. The method of claim 4, wherein the predicted answer to the received query is associated with the highest third score.

11. The method of claim 4, wherein the operation of processing each section in the subset of the processed sections separately with the received query to determine the one or more possible answers to the query and provide the third score for each possible answer that indicates the section provides the answer to the query comprises processing, by a neural network, each section in a subset of the processed sections separately with the received query to determine the one or more possible answers to the query and provide the third score for each possible answer that indicates how well the received query matches the section.

12. A method, comprising:
in response to receiving a query that relates to a document, dividing the document into multiple sections that each comprise a portion of the document, wherein the dividing of the document into the multiple sections is based on a format, the document including one or more sections, each section comprising a span of sentences in the portion of the document, the each section comprising content and a description of the content, the content and the description of the content being distinct, and wherein the operation of combining the first and the second scores comprises concatenating the first and the second scores to produce a vector;

for each section:
determining, by a processing circuitry based on the query and the section, a first score, wherein the first score indicates relevance of the query to the section, and wherein the relevance is determined based at least upon an encoding of the query and an encoding of a description of content of the section;

determining, by the processing circuitry based on the query and the section, a second score, wherein the second score indicates a similarity of words between the query and the description of content of the section; and generating, based on the first and the second scores, a final score of the section;

determining, based on content of each section in a subset of sections and the query, a third score associated with each of one or more possible answers, wherein the third score indicates probability of the possible answer being an answer to the query, wherein the third score for each section is based on a ranking of the final scores of the respective sections;

determining a predicted answer to the query based on each third score; and providing the predicted answer.

13. The method of claim 12, further comprising:
prior to processing, by the processing circuitry, the encoded sentences to determine one or more sentences in the section that are relevant to the encoded query, concatenating each encoded sentence with a relevance score to produce a concatenated value, wherein each section of the divided document into the multiple sections comprises a span of sentences in the portion of the document, and wherein the operation of processing, by the processing circuitry, the encoded sentences to determine one or more sentences in the section that are relevant to the encoded query comprises processing, by the processing circuitry, each concatenated value to determine one or more sentences in the section that are relevant to the encoded query.

14. The method of claim 13, wherein the dividing of the document into the multiple sections is based on a format.

15. The method of claim 13, wherein the similarity of words between the query and the description of content of the section is determined using a cosine similarity.

16. The method of claim 12, further comprising:
- prior to selecting the predicted answer, for each relevant sentence, comparing one or more sentences adjacent to the relevant section; and
- determining a fourth score for that section based on the comparisons.

17. The method of claim 16, wherein the operation of selecting the predicted answer to the query based on each third score comprises selecting the predicted answer to the query based on each third and fourth scores.

18. The method of claim 12, further comprising providing the predicted answer to a computing device.

19. The method of claim 12, wherein the processing circuitry comprises:
- a first neural network and
- one of an information retrieval system or an embedded information retrieval system.

* * * * *